(12) United States Patent
Muller

(10) Patent No.: US 8,794,641 B2
(45) Date of Patent: Aug. 5, 2014

(54) MULTI USE RECREATIONAL UTILITY VEHICLE

(76) Inventor: Christopher Muller, Holly, MI (US)

( * ) Notice: Subject to any disclaimer, the term of this patent is extended or adjusted under 35 U.S.C. 154(b) by 91 days.

(21) Appl. No.: 13/444,935

(22) Filed: Apr. 12, 2012

(65) Prior Publication Data

US 2013/0127125 A1 May 23, 2013

(51) Int. Cl.
*B60G 17/00* (2006.01)
*B60P 1/00* (2006.01)

(52) U.S. Cl.
USPC .......... 280/6.153; 280/62; 280/204; 280/239; 280/124.134

(58) Field of Classification Search
USPC .......... 280/6.153, 204, 239, 292, 406.2, 407, 280/407.1, 418.1, 62, 124.134
See application file for complete search history.

(56) References Cited

U.S. PATENT DOCUMENTS

| | | | | |
|---|---|---|---|---|
| 4,057,283 A | * | 11/1977 | Barnett | 296/173 |
| 4,372,568 A | * | 2/1983 | Campbell | 280/63 |
| 5,308,096 A | * | 5/1994 | Smith | 280/204 |
| 5,653,494 A | * | 8/1997 | Cleall et al. | 296/181.3 |
| 6,082,809 A | * | 7/2000 | Edgeller et al. | 296/181.3 |
| 6,089,650 A | * | 7/2000 | Edgeller et al. | 296/182.1 |
| 6,199,909 B1 | * | 3/2001 | Kass et al. | 280/789 |
| 6,213,539 B1 | * | 4/2001 | Williams et al. | 296/185.1 |
| 6,367,866 B1 | * | 4/2002 | Moore | 296/182.1 |
| 6,634,700 B1 | * | 10/2003 | Calvert | 296/180.4 |
| 6,634,701 B2 | * | 10/2003 | Votruba et al. | 296/182.1 |
| 6,910,609 B2 | * | 6/2005 | Williams et al. | 224/519 |
| 7,144,070 B2 | * | 12/2006 | Wiebe et al. | 296/185.1 |
| 7,806,463 B2 | * | 10/2010 | Oliver et al. | 296/168 |
| 8,439,426 B2 | * | 5/2013 | Dempsey et al. | 296/173 |
| 2006/0273622 A1 | * | 12/2006 | Laird | 296/168 |
| 2012/0181765 A1 | * | 7/2012 | Hill et al. | 280/62 |

* cited by examiner

*Primary Examiner* — Toan To

(57) ABSTRACT

A micro weight enclosure when fully loaded with gear and equipment is capable of being towed by vehicles with gross tow weight ratings of less than 1000 lbs. This enclosure does not utilize a traditional chassis, rather uses common manufacturing of panel assemblies mechanically attached together forming the basic structural elements required for strength at minimal weight and reduced wind drag.
The enclosure, being ergonomically optimized, allows enough space to stand in one location, but sit, recline, or lay prone in a most comfortable fashion, and to attend to human hygiene and related activity in a secure protected environment.
The independent suspension couples directly to the enclosure lowers the vehicle, reducing wind drag, allowing enclosure leveling, improves ingress, egress, and overall occupant comfort.
The enclosure being acceptable for day travel; surfing or partying in urban and rural environments as example, or extended travel; road trips or camping as example.

13 Claims, 10 Drawing Sheets

MULTI USE RECREATIONAL UTILITY VEHICLE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

This invention relates to towable recreational utility vehicles, a camper shell, or more particularly, an enclosure specifically designed for super sub compact vehicles with tow weight ratings of 1000 lbs or less.

Recreational vehicles are generally use to provide human comfort and transport items convenient for individuals or groups engaged in activities remote from a persons primary domicile; hiking, swimming, surfing, camping, hunting, and skiing as examples. As the transportation market moves toward smaller, lighter, more gas efficient vehicle, providing additional occupant comforts and conveniences during these activities becomes marketable.

Various enclosures for recreational vehicles, travel trailers, campers, utility vehicles of multiple sizes, forms, and weights are well known in prior art which utilize; a fully rigid enclosure, a semi-rigid or pop up enclosure using a rigid structure coupled to a tent like structure, or a compliant inflatable structure, all three aforementioned enclosures then being attached to chassis with one or more wheels.

Rigid recreational utility vehicles at or near the 1000 lb gross vehicle weight rating have dry weights of near 1000 lb, as the enclosure does not efficiently provide structure back to the chassis and wheel set, the result is little or no cargo capacity for the towed vehicle. Rigid recreational utility vehicles also cause excessive vehicle drag as the enclosure sits atop a chassis then a top an axled wheel set. Compromises in enclosure height to combat vehicle drag has resulted in poor ergonomics for standing within the vehicle. Further attempts to minimize rigid recreational enclosure while maintaining traditional construction technique has provided for poor sitting and sleeping comfort.

Compliant enclosures contain foldable, inflatable, slideable or otherwise deployable strategies used to achieve the recreational vehicles function at reduced weight and wind drag levels. These compliant enclosure strategies have numerous drawbacks, paramount is the human effort required to erect and deploy the compliant portion of the enclosure. Additional drawbacks include poor protection from the elements, poor personal security, and poor personal property protection. A further drawback is the size and appearance of deployed semi rigid recreational vehicle making its use limited in many instances, an overnight party at a friends requiring parking on a city street as example.

Using common materials and modern manufacturing techniques for recreational utility vehicles leave owners of sub compact and super sub compact vehicles with tow ratings of less than 1000 lbs few good options for vehicles with rigid enclosures.

BRIEF SUMMARY OF INVENTION

According to the illustrative embodiment of the present disclosure, a rigid recreational utility vehicle is shown which comprises a multi-dimensional optimized enclosure reducing weight, increasing load carrying capacity while improving occupant ergonomics.

It would be advantages to provide a vehicle that, even fully loaded with gear or equipment, could be towed by vehicles with a 1000 pound tow rating or less. As the illustrative embodiment of the present disclosure will show a recreational utility vehicle containing a chassis-less load transfer system comprising an enclosure for structural integrity utilizing modular panels, an integrated tow vehicle coupling system, and a suspension system bridging the structural enclosure to the ground engaging system.

According to a further illustrative embodiment of the present disclosure, a recreational/utility vehicle is shown comprising partitioning within an enclosure optimizing ergonomics, providing for an individual to stand erect, sit, and lie down in full comfort, while the rigid enclosure provides maximum personnel security and full protection from the elements. A further illustrative embodiment of the present disclosure will show partitioning allows for division of the enclosure necessary for human grooming and hygiene activities, provides for work surfaces, and provide shelves and supports.

It would be advantageous to provide for a recreational utility vehicle that has easy ingress, egress, and rigid vehicle stability when entered by occupant. According to a further illustrative embodiment of the present disclosure, a recreational utility vehicle is shown comprising a suspension which provides for the suspension to be locked level utilizing a locking pin, to be dropped flat on the ground utilizing a release nut or by removing the suspension assemblies altogether, or lie level on uneven ground when locking pin and release nut are used together. A further illustration embodiment will show insertion of the suspension lock pin stabilizes the enclosure in its nominal, loaded, travel position.

According to a further illustrative embodiment of the present disclosure, a recreational/utility vehicle is shown which comprises an enclosure optimized for aerodynamics, minimizing aerodynamic drag at highway speeds but not compromising aforementioned functions.

The above mentioned and other features of this invention, and the manner of attaining them, will become more apparent and the invention itself will be better understood by reference to the following description of the embodiments of the invention taken in conjunction with the accompanying drawings.

Corresponding references characters indicate corresponding parts through several views. Although the drawings represent embodiments of the present invention, the drawings are not necessarily to scale and certain features may be exaggerated in order to better illustrate and explain the present invention.

DETAILED DESCRIPTION OF THE INVENTION

The embodiments disclosed below are not intended to be exhaustive or to limit the invention to the precise forms disclosed in the following detailed description. Rather, the embodiments are chosen and described so that others skilled in the art may utilize there teachings. For example, while the following description refers primarily to recreational utility vehicles, certain features described herein would apply to other applications such as travel trailers, campers, day trailers, hunting blinds, and fishing shanty's.

Figure 1:
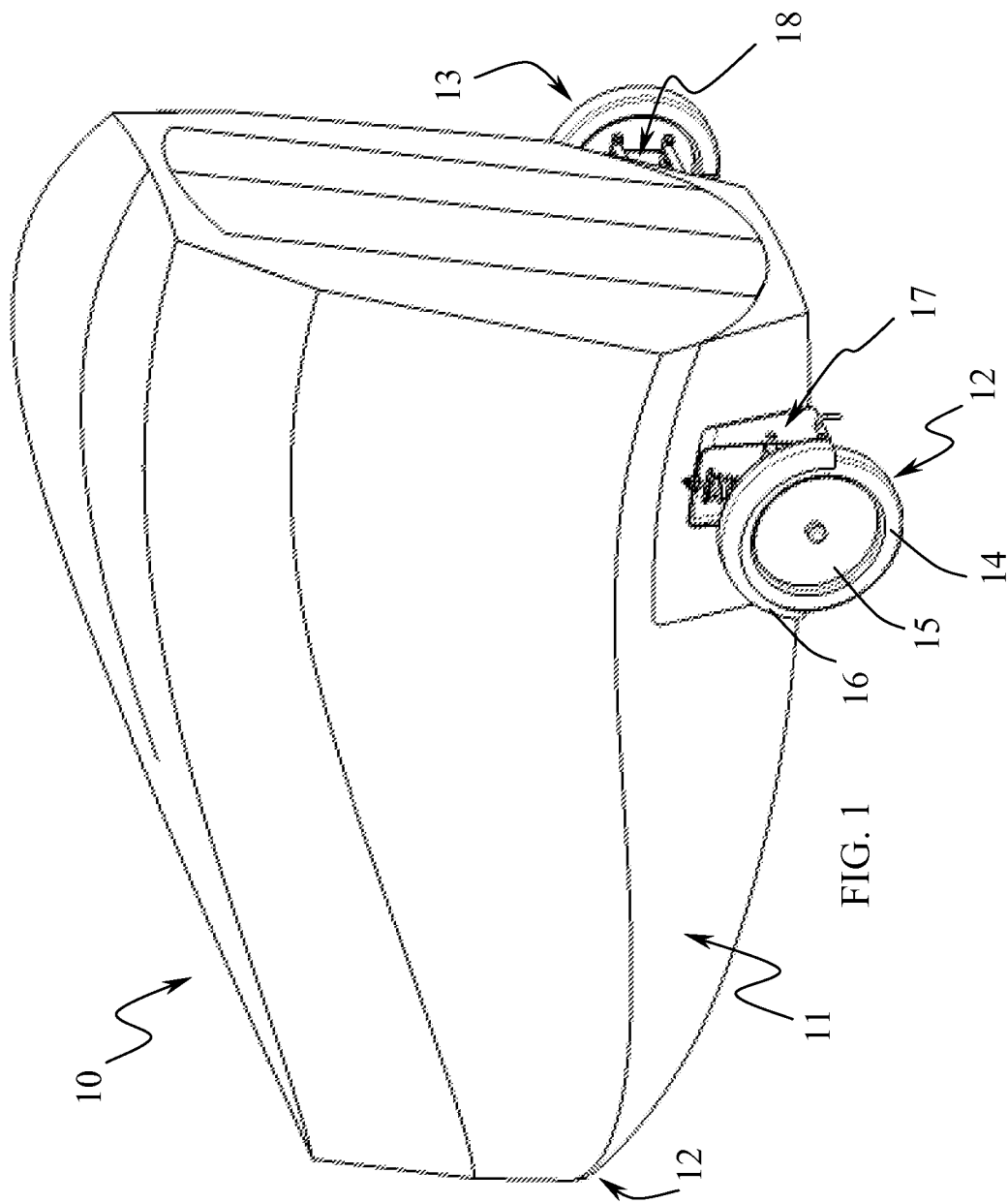
FIG. 1 shows a left side rear perspective view illustrating the vehicle in the present disclosure.

With reference first to FIG. 1, the vehicle of the present disclosure will be described. The vehicle shown generally at 10 and is commonly referred to as a recreational vehicle, a travel trailer, a camper, or a utility trailer. As shown, vehicle 10 generally comprises a structural enclosure system 11, supported by ground engaging member 12 and 13. As shown in this disclosure, ground engaging member 12 is comprised of wheel 14, tire 15, and fender 16. In conjunction with or in place of wheel 13, tire 14, and fender 15 a ground engaging member may just as easily be ice skis, snow skis, or water floats. Vehicle 10 further comprises a left hand suspension system 17 and right hand suspension system 18 operatively connecting ground engaging member 12 and 13 to structural enclosure system 11. Vehicle 10 further comprises an integrated tow vehicle coupler system 19 shown opposite ground engaging members 12 and 13 integrated into the structural enclosure system.

Figure 2:
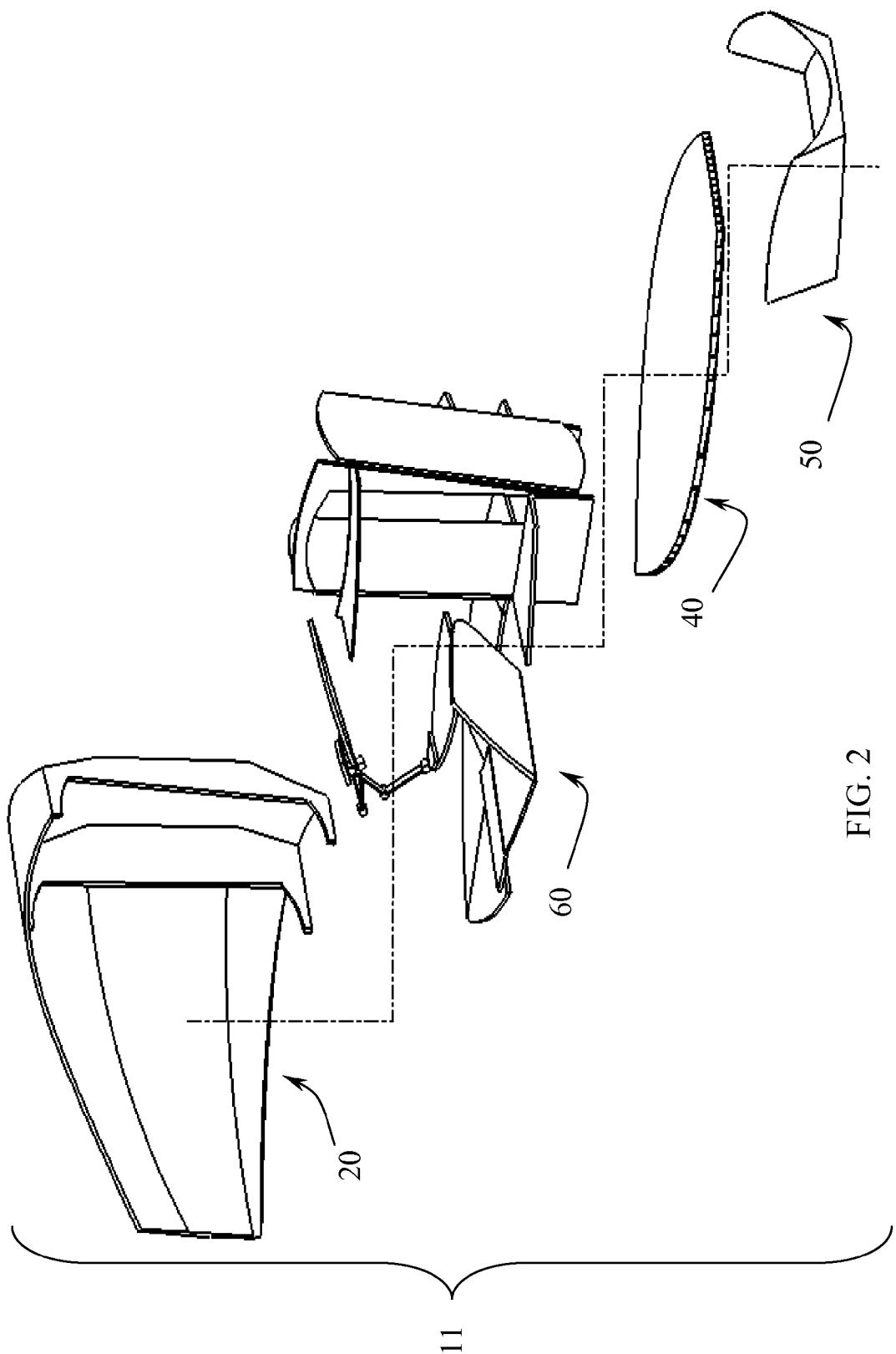
FIG. 2 shows a left side rear perspective assembly diagram showing the main groups of components of the vehicle enclosure illustrated of FIG. 1.

With respect now to FIG. 2, showing enclosure 11 generally comprising a wall load system 20, a partition system 60, a floor load system 40, and a wall to suspension reinforcement system 50.

Figure 3:
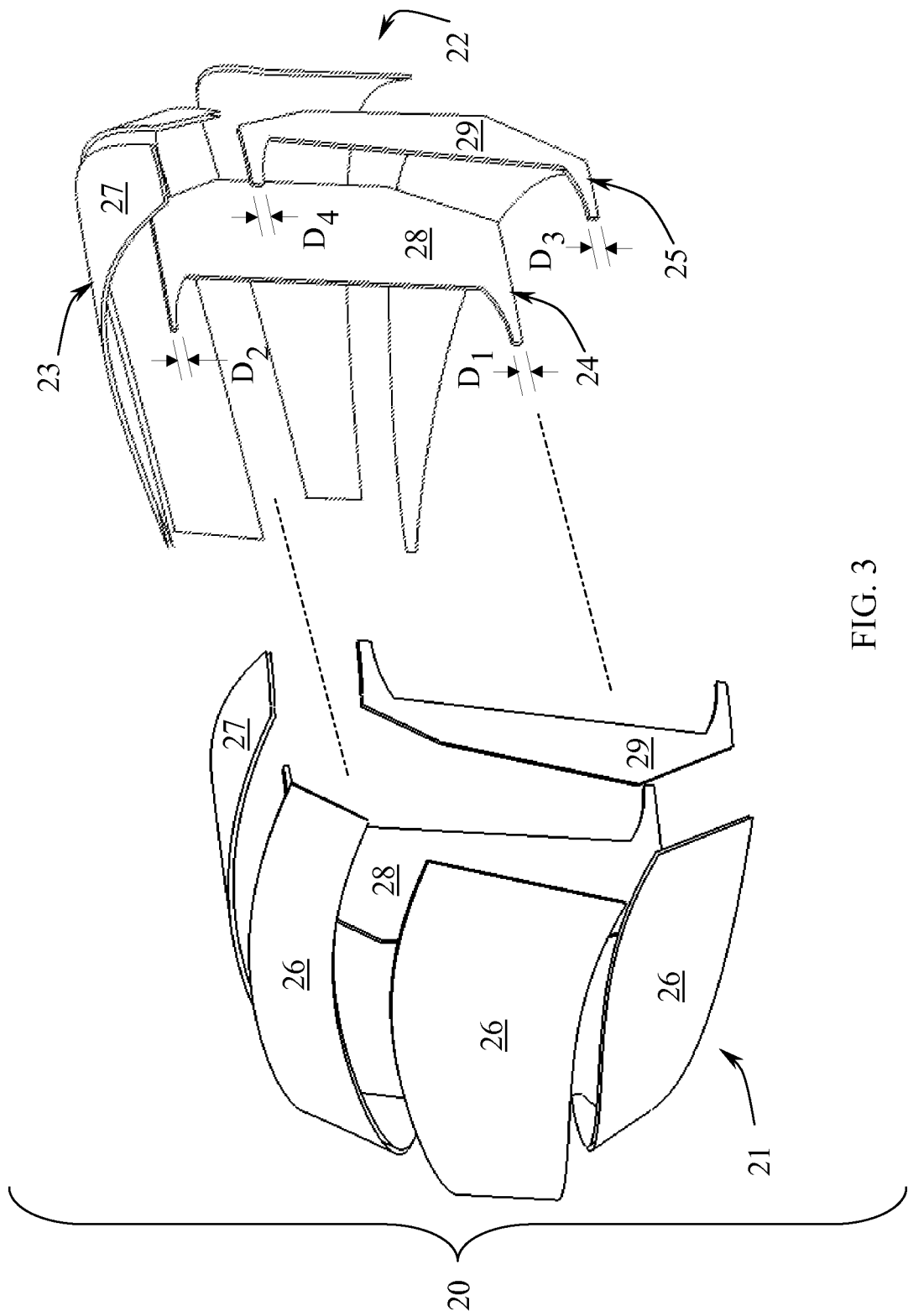
FIG. 3 shows a left side rear perspective exploded view of the main enclosure of the vehicle of FIG. 1.

With respect now to FIG. 3, wall load system 20 will be described in greater detail. Wall load system 20 is generally comprised as a left hand side wall assembly 21, a right hand side wall assembly 22, an upper wall assembly 23 a middle wall assembly 24, and a rear wall assembly 25. Side wall assembly 21 comprising a plurality of side wall sub-assemblies 26. Upper wall assembly 23 may comprises a plurality of upper wall sub assemblies 27, or could be conceived to be formed into side wall sub assemblies 26 or as a single piece upper wall section utilizing generous radii between upper wall assembly 23, side wall assembly 21 and 22 and floor load system 40. Middle wall assembly 24 comprising a plurality of upper wall assemblies 28, or could be conceived as a single piece wall assembly. Rear wall assembly 25 comprising a plurality of upper wall assemblies 29, or could be conceived as a single piece wall assembly. FIG. 3 side wall sub assemblies 26, upper wall sub assemblies 27, middle wall sub assemblies 28, and rear wall sub assemblies 29 as shown count twelve, but could be conceived to count six as developed for enclosure 11 (FIG. 1) spatial ergonomics and load management requirements for frameless vehicle 10, with due considerations for design limits imposed by material availability, sheet stock size as example, and manufacturing processes, sheet metal edge hemming as example.

With respect still to FIG. 3, wall load system 20 will be described in further detail. Wall load system 20 comprising middle wall assembly 24 and a rear wall assembly 25 comprising a plurality of sub assemblies 28 and 29. Both middle wall assembly 24 and rear wall assembly 25 contain openings humans can pass through. Middle wall assembly 24 leaves material D1 and D2 with rear wall assembly 25 leaving material D3 and D4 at top and bottom of wall opening as defined by load management requirements for frameless vehicle 10.

Figure 4:
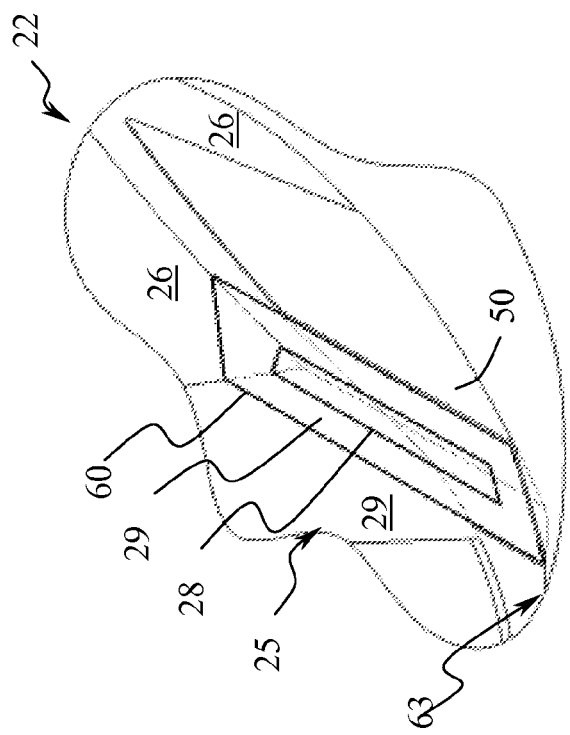
FIG. 4 shows an enlarged cross sectional perspective view of the lower rear right corner of the vehicle of FIG. 1.

With respect to FIG. 4, wall load system 20 will be described in yet greater detail. Right hand side wall system 22 is shown comprising two side wall sub assemblies 26, rear wall assembly 25 comprising rear wall sub assembly 29, and wall to suspension reinforcement system 50. Shown further is a section through the lower right corner of rear wall system 25 and right hand wall side assembly 22 comprising an inner skin 28, an insulating spacer 29, and an outer skin 60. The material type and thickness of inner skin 28 and outer skin 60, the material and width of insulating spacer 29 is defined by load management requirements for frameless vehicle 10, bending and shear strength of sub assembly as example, with due considerations for design limits imposed by material availability, standard sheet stock thickness as example and manufacturing processes, encapsulation molding as example. Materials used for inner skin 28, outer skin 60, could be conceived as aluminum, plastics, or composites, cut sheet stock or press formed, using common manufacturing processes, sheet metal pressing as example. Similarity, insulating spacer 29 could be conceived as polymers or paper, urethane foam as example utilizing common manufacturing processes, injection molding as example.

Wall load system 20 comprising left hand wall assembly 21 and right had wall assembly 22, all sub assemblies 26, upper wall assembly 23 comprising upper wall sub assemblies 27, middle wall assembly 24 comprising middle wall sub assemblies 28, rear wall assembly 25 comprising rear wall sub assemblies 29 similarly comprise an inner skin 28, an insulating spacer 29, and an outer skin 60.

Figure 5:
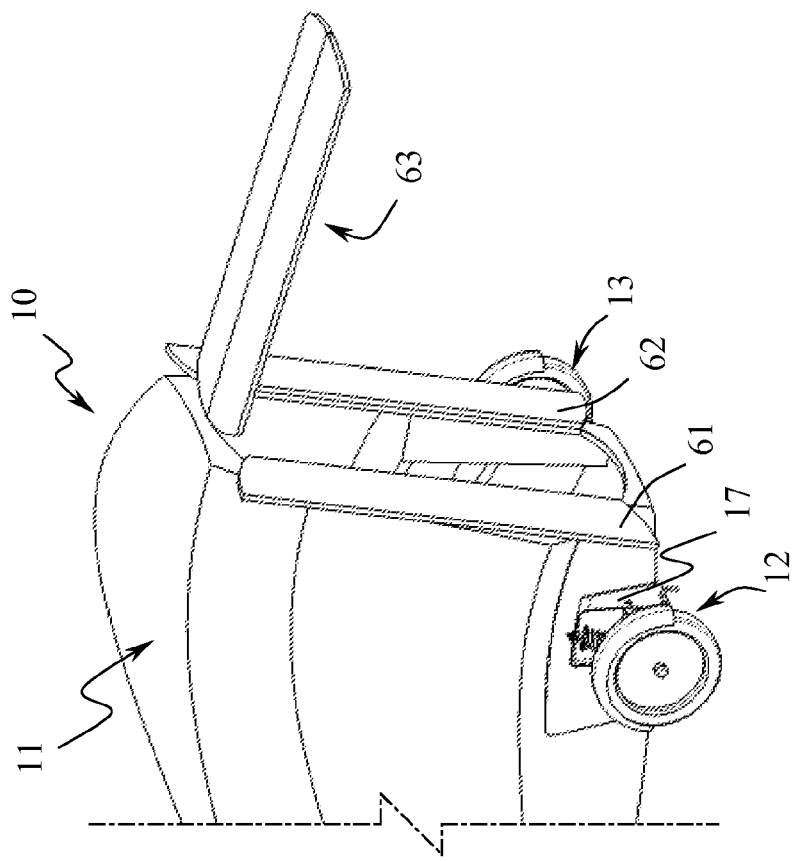
FIG. 5 shows a left side rear perspective view of the vehicle of FIG. 1 illustrating vehicle in present disclosure access and flip up canopy doors.

With respect to FIG. 5, vehicle 10 is shown comprising enclosure 11, suspension system 17, and left hand ground engaging members 12 and right hand ground engaging member 13. Rear wall assembly 25 comprising a human pass through with left hand door assembly 61 and right hand door assembly 62. Left hand door assembly 61 and right hand door assembly 62 being hinged to rear wall assembly 25 with removable hinge pins. The said removable hinge pins being replaceable onto the top of left hand door 61 and onto the top of right hand door 62 allowing door 61 and door 62 to swing vertically up forming the basis for canopy support 63.

Figures 6, 7:
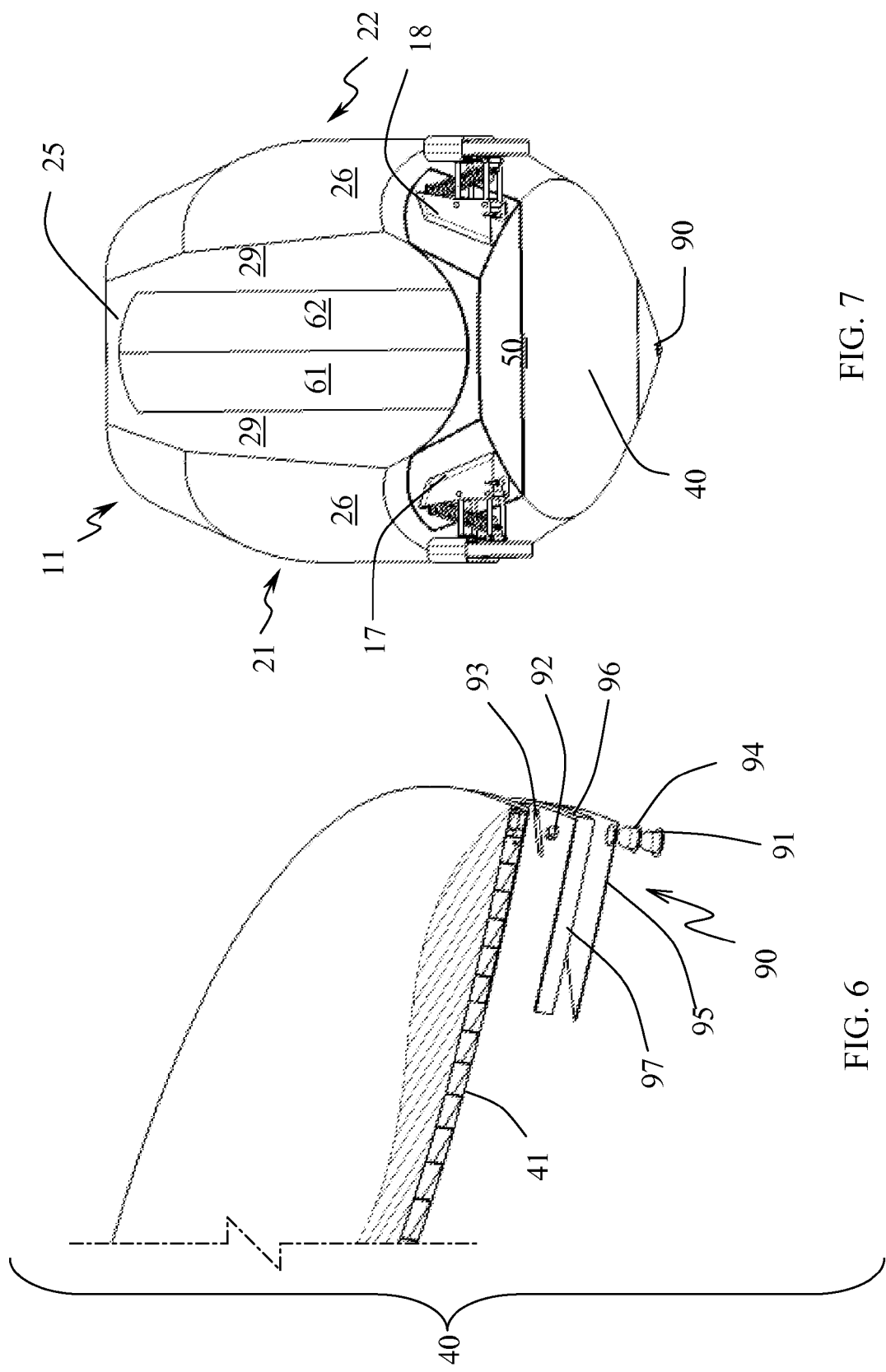
FIG. 6 shows a left side front perspective view of the vehicle of FIG. 1 floor assembly system.
FIG. 7 shows a bottom rear perspective view of the vehicle of FIG. 1.

With respect now to FIG. 6, floor load system 40 will be described in greater detail. Floor load system 40 comprising a plurality of individual extrusions 41 assembled together by conventional manufacturing methods. FIG. 6 further describing floor load system 40 counts thirty six individual extrusions 41 but could be conceived to count more or less as section thicknesses, section height, and section width of extrusions 41 is defined by load management requirements for frameless vehicle 10; Materials used for extrusion 41 could be conceived as aluminum or plastic using common manufacturing processes, aluminum extrusion as example.

With respect still to FIG. 6, floor load system 40 comprising an integrated vehicle tow coupler system 90 allowing vehicle 10 (FIG. 1) to be towed. Integrated vehicle tow coupler system 90 comprising a ball cup 91 which is in physical contact with tow vehicle, further comprising ball cup lock plate 92, ball cup lock pin 93, ball cup insulator 94, forming basis of coupling lock system. Integrated vehicle tow coupler system 90 further comprising ball cup reinforcement plate 95, left hand extrusion tie 96, right hand extrusion tie 97 disseminating energy into floor load system 40 and enclosure 11. The material and thickness of components of integrated vehicle tow coupler system 90 is defined by load requirements for frameless vehicle 10, shear strength of sub assembly as example and could be conceived as aluminum, plastics with due regard for manufacturing processes, welding as example.

With respect now to FIG. 7, enclosure to suspension reinforcement system 50 will be described in greater detail. Floor load system 40 comprising assembled extrusions 41 is attached to enclosure 11 along entire floor periphery. Floor to wall reinforcement system 50 begins on left hand side wall system 21 and side wall sub assembly 26 above suspension left hand suspension system 17 moving rearward to rear wall system 25 and rear wall sub assembly 29 around corner traveling in an arc below rear wall door 61 along rear wall door 62 up to right hand side wall system 22 and right hand wall sub assembly 26 around corner and forward above right hand suspension system 18 then forward near middle wall system 24 and middle wall sub assembly 28 then down to floor load system 40 around corner then straight across floor load system 40 back to left hand side wall system 21 and left hand side wall sub assembly 26 then up left hand side wall assembly 21 and up to height equal to the point of beginning above left hand suspension 17 and rearward to close the loop. Loads generated on or through enclosure 11 and floor load system 40 pass through the integrated vehicle tow coupler system 90 at for forward end of vehicle 10 and through the wall to suspension reinforcement 50 into suspension 17 and 18 to ground engagement members 12 and 13. Material used for reinforcement 50 could be conceived as aluminum, plastic, or composites, cut sheet stock or press formed, using common manufacturing processes, sheet metal bending and welded as example.

Figure 8:
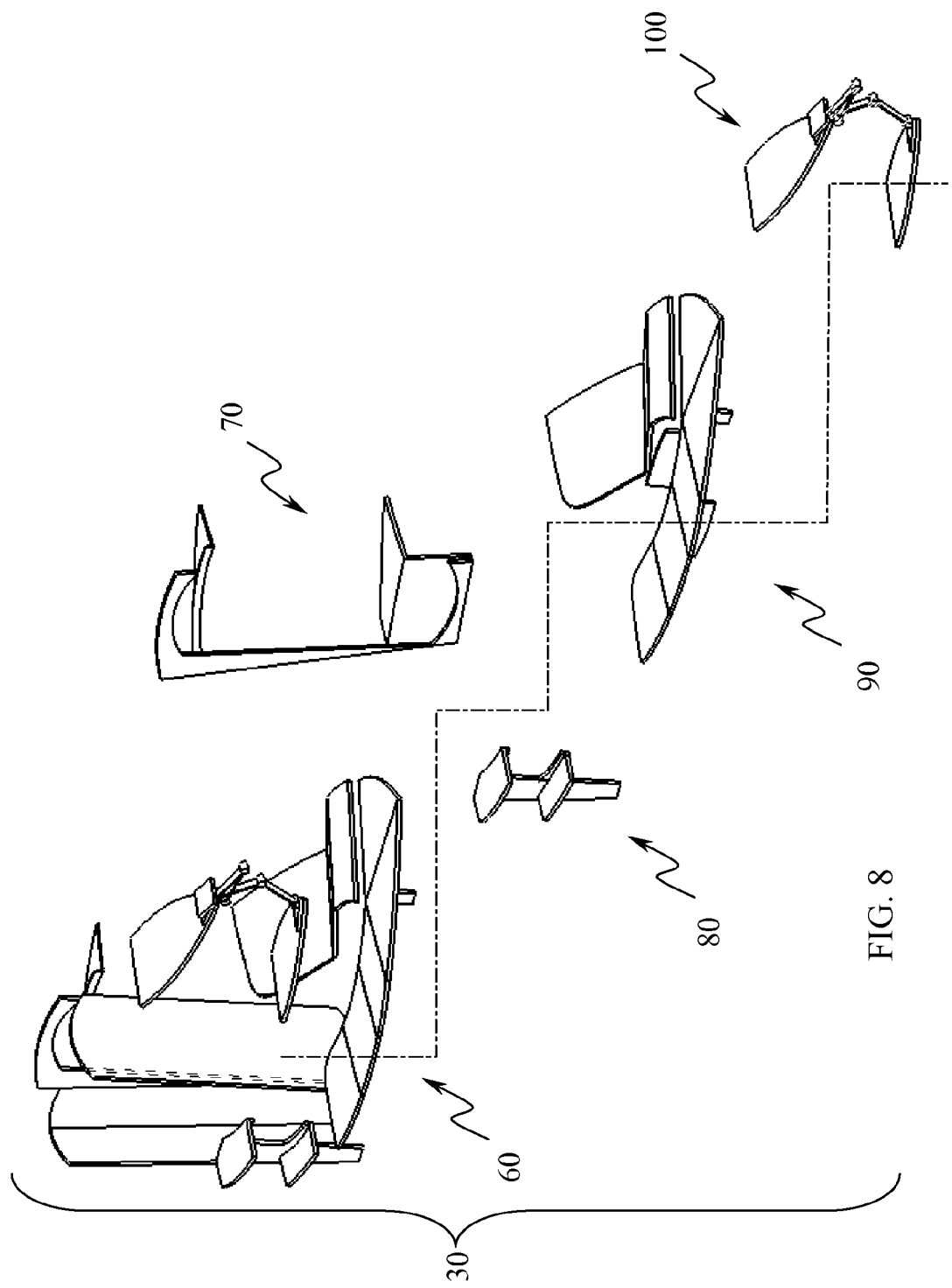
FIG. 8 shows a left side front perspective assembly diagram showing the main groups of components of the partition wall system illustrated of FIG. 2.

With respect now to FIG. 8, showing partition wall system 30 (FIG. 2), comprising an spatial layout 60 derived from base ergonomic requirements utilizing a closet partition system 70, a work surface partition system 80, a bed partition system 90, and a floating partition system 100.

Figure 9:
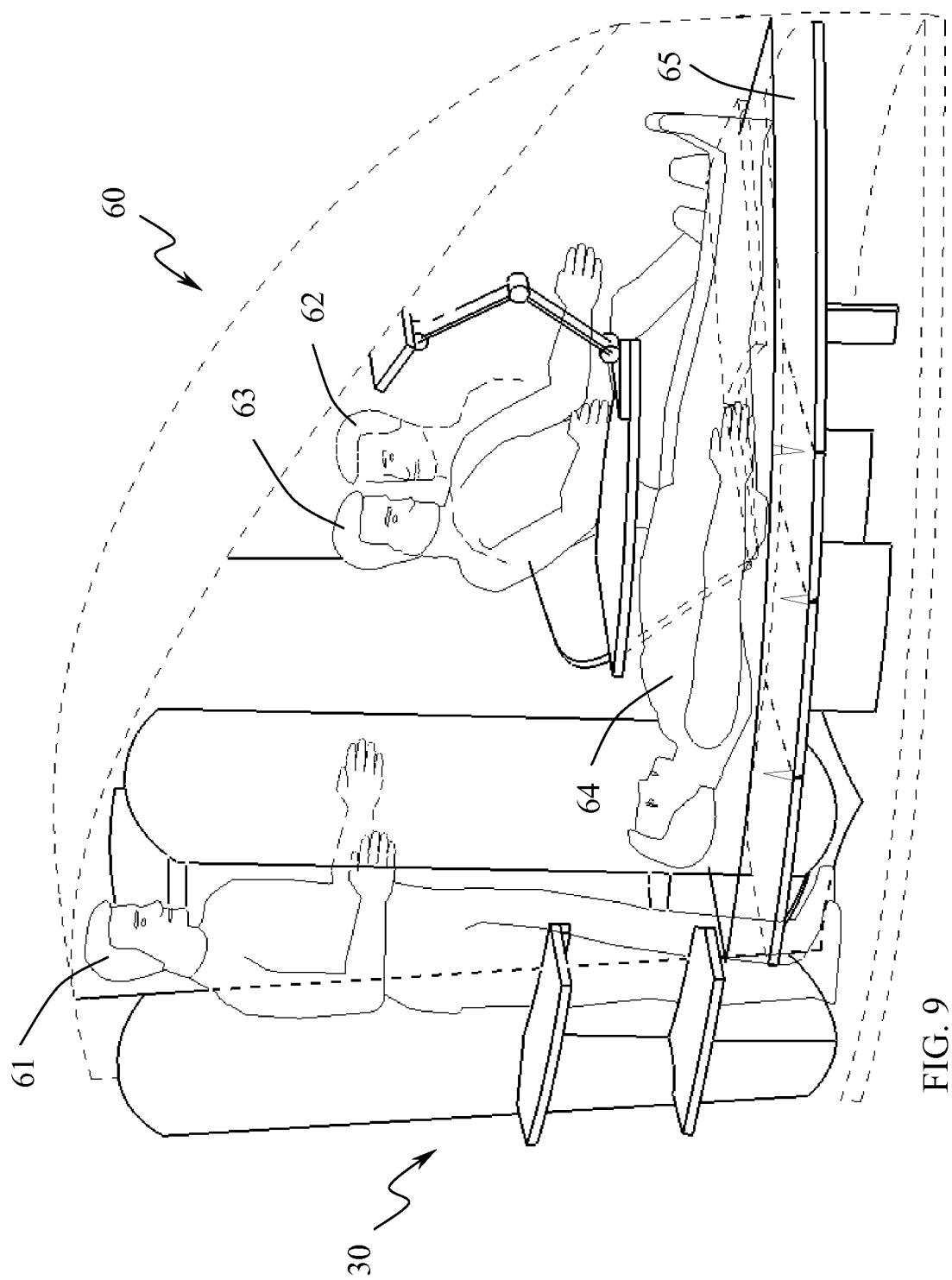
FIG. 9 shows a left side front perspective of the ergonomic spatial layout of FIG. 8.

With respect now to FIG. 9, the spatial layout 60 contained within partition system 30, driven by base ergonomic requirements comprising a single location to stand 61, to sit prone or slightly reclined 62, to lie torso elevated, thighs and calves adjusted 63, or to lie flat 64. Cushion 65 bridging between bed partition system 90 (FIG. 8) and sitting position 62, elevated and adjusted position 63, and lying position 64. Alternate customer usage profiles could form various spatial layout 60, changing the static and dynamic loads for vehicle 10, and would necessarily change various aspects of enclosure 11 (FIG. 2), and partition system 30.

Figure 10:
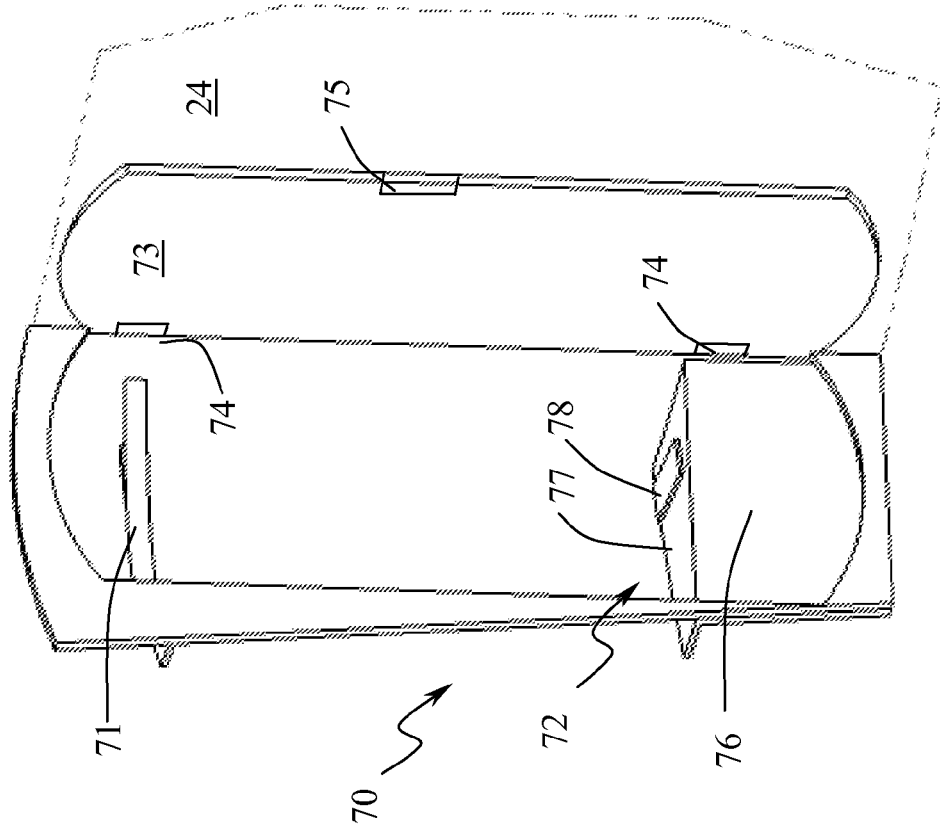
FIG. 10 shows a right side rear perspective view of the closet partition layout of FIG. 8.

With respect now to FIG. 10, closet partition system 70 comprising upper shelf 71, lower shelf 72, partition door 73. Partition door 73 comprising hinge 74 and latching mechanism 75 where by middle wall 24 shown in phantom line forms cabin separation and isolation between the closet partition 70 and main cabin area containing bed partition system 90 when partition door 73 is open as shown in FIG. 10. Lower shelf 72 further comprising lower shelf facing 76, lower shelf sitting plate 77, and removable lower shelf sitting plate cover 78. Removable lower shelf sitting plate 78 further comprising waste bag attachment mechanisms.

Figure 11:
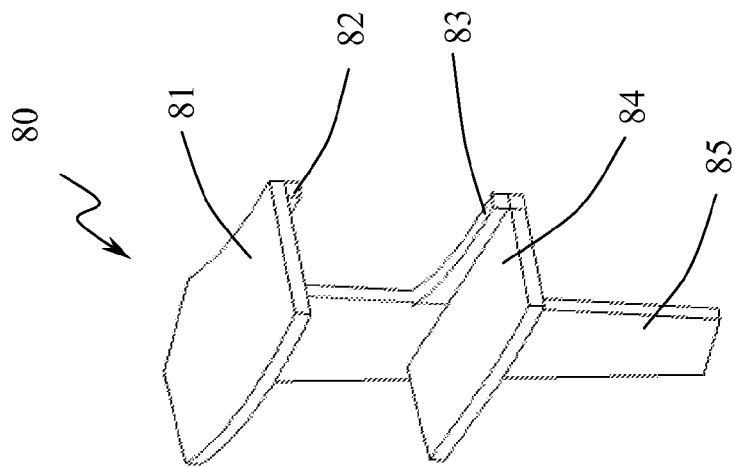
FIG. 11 shows a right side front perspective view of the work shelf partition layout of FIG. 8.

With respect now to FIG. 11, a working surface shelf system 80 comprising upper shelf 81, upper shelf facing 82, lower shelf 83, lower shelf facing 84, and shelf system facing 85.

Figure 12:
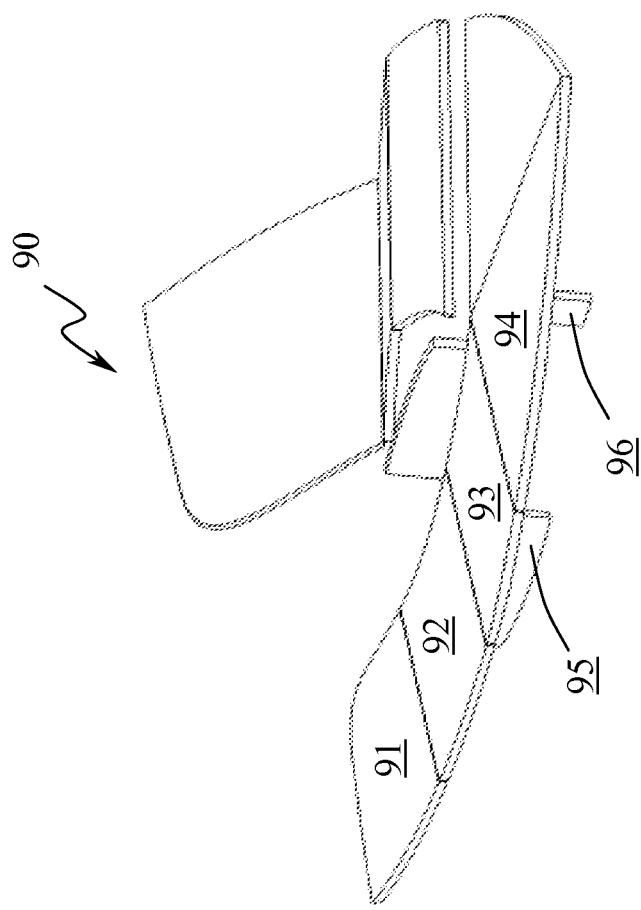
FIG. 12 shows a right side front perspective view of the bed partition system of FIG. 8.

With respect now to FIG. 12, a bed partition system 90 comprising torso board 91, thigh board 92, calf board 93, bed partition system hinge support 94, peak board 95, peak board support 96 providing for a location to sit prone or slightly reclined 62 (FIG. 9), or to lie flat 64 (FIG. 9). Bed partition system 90 further comprising hinges, swing bar and locking pins located on and between torso board 91, thigh board 92, and calf board 93 allowing each to be adjusted individually providing for a torso elevated, thighs and calves adjusted 63 (FIG. 9).

Figure 13:
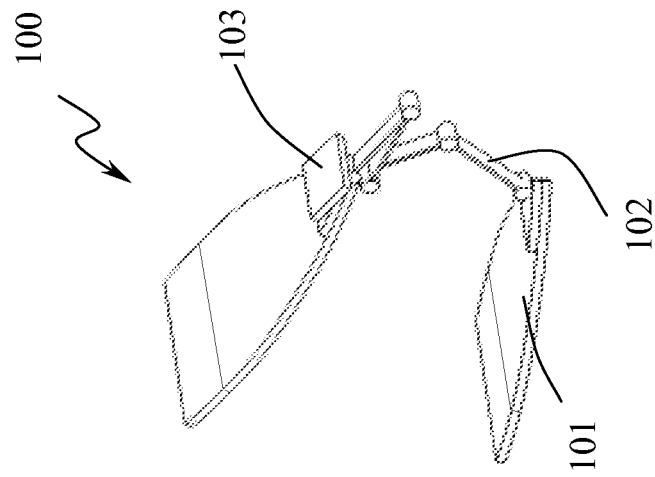
FIG. 13 shows a right side front perspective view of the floating partition system of FIG. 8.

With respect now to FIG. 13, floating partition system 100 comprising a foldable floating partition 101, articulating adjustable support system 102, and upper wall attachment support 103. Articulating adjustable support system 102 allows foldable floating partition 101 to move up to a stowed position along upper wall assembly 23 (FIG. 3) and allowing partition 101 to function as table top and shelf system through out enclosure 11 for all ergonomic positions 62 (FIG. 9), 63 (FIG. 9), and 64 (FIG. 9).

As shown in FIG. 1 through FIG. 8 and FIG. 9 through FIG. 13, enclosure 11 (FIG. 1) is comprised of plurality of wall and partition assemblies containing skins and insulating spacers of various thickness and materials. Joining of these panel assemblies is key in transferring loads generated from customer usage into the ground engagement member and tow vehicle coupler. Mechanical methods of joining thin skinned panels could be hemming, interlocking flanging, brazing, or adhesion, as example. Mechanical means of joining thicker skinned panels could be riveting, bolting, welding, or again adhesion, as example.

Figure 14:
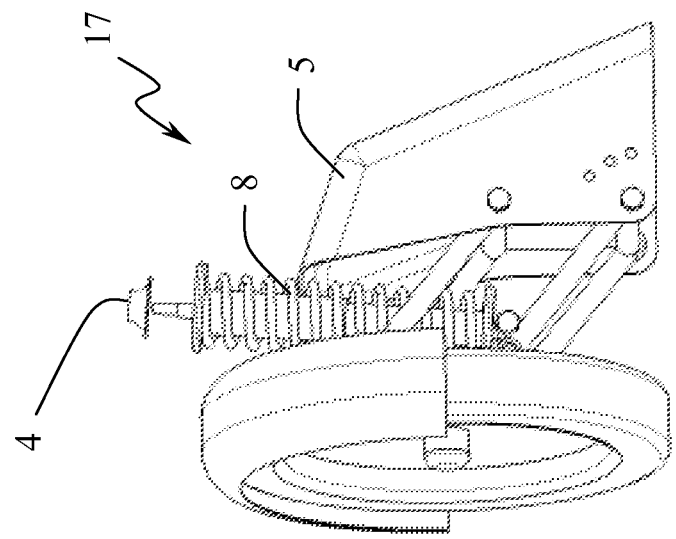
FIG. 14 shows a left side front bottom perspective view of the suspension system of FIG. 1.

With respect now to FIG. 14, left hand suspension system 17 will be described in detail. Left hand suspension 17 comprises hinge plate 5 fastened to swing arms 9 and strut assembly 8. Left hand suspension system 17 further comprises inner suspension plate 7 and outer king pin plate 6. Further comprising left hand suspension system 17 are suspension components, such as nuts, bolts, washers, and bearings as examples. FIG. 14 further shows left hand suspension system 17 attached to ground engaging member 12 comprising tire 14, wheel 15, and fender 16. Left hand suspension system 17 and right hand suspension system 18 (FIG. 7) further comprising lock pin 3, which may be inserted through hinge plate 5, engaging swing arm 9, and inner suspension plate 7 allowing vehicle 10 (FIG. 1) to become vertically stable. Locking pin 3, when inserted through different holes in hinge plate 5 allows vehicle 10 (FIG. 1) to be leveled on unleveled ground. In the present disclosure, the left hand suspension system 17 is known as double swing arm, but any suspension system could be contemplated, torsion bar as example.

Figure 15:
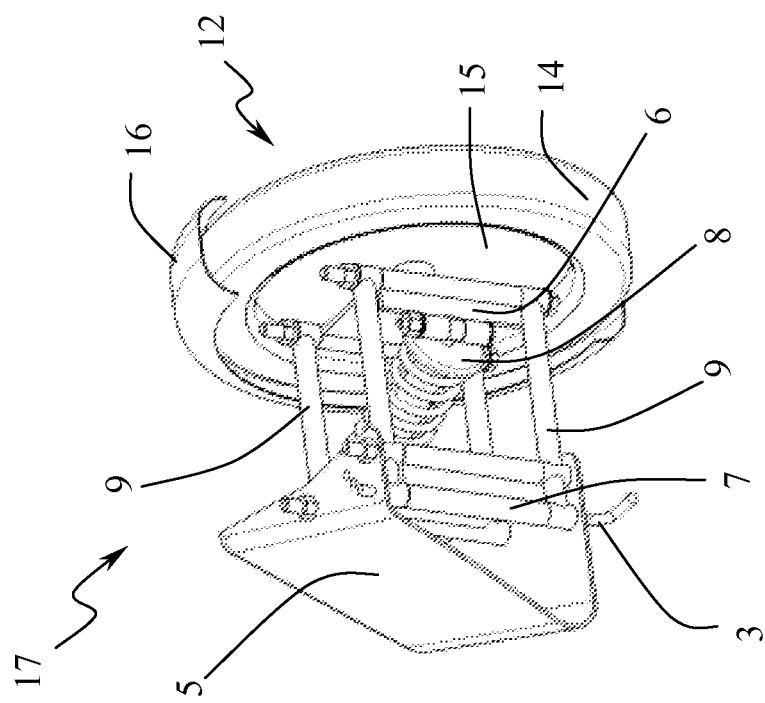
FIG. 15 shows a left side rear perspective view of the suspension system of FIG. 1.

With respect now to FIG. 15, left hand suspension system 17 is shown further comprises a quick release attachment 4 which allows strut 8 to wing inboard of hinge plate 5 so that left hand suspension system 17 may translate up allowing vehicle 10 (FIG. 1) to settle on to ground. With left hand suspension system 17 and right hand suspension system 18 (FIG. 7) settled on to the ground, decoupling from tow vehicle allows vehicle 10 (FIG. 1) to sit as solid platform on ground. Both suspension system 17 and symmetrically opposite right hand suspension system 18 (FIG. 7) could be conceived to be removable from enclosure 11 through attachment methods, nuts and bolts, as example.

What is claimed is:

1. A recreational utility vehicle, comprising:
    first, second, and third load transfer points, the first load transfer point being forward at a vehicle coupler, and the second and third load transfer points being rearward at a suspension;
    a floor load transfer system coupled to the suspension;
    a primary wall load system coupled to the floor load transfer system, the primary wall load system having two side walls, a middle wall, a rear wall, and an upper wall, the rear wall having an opening extending from near a top of the rear wall to near a bottom of the rear wall, the middle wall having an opening extending from near a top of the middle wall to near a bottom of the middle wall;
    a primary wall to suspension reinforcement system coupled to the primary wall load system; and
    a partition wall system disposed within an interior region defined by the primary wall load system, the partition wall system having a partition door hinged on the middle wall, the partition door when closed encloses a closet, the partition door when open partitions a rearward portion of the interior region from a forward portion of the interior region.

2. The recreational utility vehicle of claim 1, further comprising a tow vehicle coupling system that is coupled to the floor load transfer system and not extending forward of the floor load transfer system.

3. The recreational utility vehicle of claim 1, wherein the floor load transfer system comprises multiple joined lengths of extrusion members.

4. The recreational utility vehicle of claim 1, wherein each of the two side walls, the middle wall, the rear wall, and the upper wall include an inner skin and an outer skin and an insulating material disposed between the inner skin and the outer skin.

5. The recreational utility vehicle of claim 1, wherein the closet further includes a lower closet shelf containing a hole and, a lower closet shelf hole cover, and a waste bag attachment mechanism coupled to the lower closet shelf proximate to the hole.

6. The recreational utility vehicle of claim 1, wherein the partition wall system further includes three horizontal partitions covered with a cushion, each of the three of horizontal partitions having a respective hinge, a respective support structure, and a respective lock mechanism allowing each of the three horizontal partitions to be adjustable.

7. The recreational utility vehicle of claim 1, wherein the partition wall system further includes a shelf system which is attached to an upper primary wall within the interior region.

8. The recreational utility vehicle of claim 1, wherein the partition wall system further includes a rear wall door with removable hinge pins located on both a left hand side and a right hand side of the rear wall that allows the rear wall door to swing either horizontally or vertically by removing and reinstalling the hinge pins which allows a canopy, tent, or insect netting to be deployed proximate to the rear wall.

9. A recreational utility vehicle, comprising:
    an independent left hand suspension assembly and an independent right hand suspension assembly operably attached to an enclosure of the recreational utility vehicle providing two load transfer points to first and second ground engaging members;
    first and second quick release fasteners removably coupled to the independent left hand suspension assembly and the independent right hand suspension assembly, respectively, which allows the recreational utility vehicle to set onto the ground; and
    a first locking pin configured to slide through a suspension hinge plate and a swing arm of the independent left hand suspension assembly to lock a position of the first ground engagement member relative to the enclosure to level the recreational utility vehicle on uneven ground.

10. The recreational utility vehicle of claim 9, wherein the independent left hand suspension assembly and the independent right hand suspension assembly are each attached to the enclosure through a wall to suspension reinforcement system.

11. The recreational utility vehicle claim 9, wherein the independent left hand suspension assembly and the independent right hand suspension assembly are removably coupled to the enclosure of the recreational utility vehicle.

12. The recreational utility vehicle of claim 9, wherein the first quick release fastener is located atop a suspension spring strut that when turned will allow for horizontal leveling of the enclosure, and if the first quick release fastener is further turned then the independent left hand suspension assembly is rotatable and the enclosure is disposed on the ground.

13. The recreational utility vehicle of claim 9, further comprising a second locking pin configured to slide through a suspension hinge plate and a swing arm of the independent right hand suspension assembly to lock a position of the second ground engagement member relative to the enclosure.

* * * * *